United States Patent [19]

Ballet

[11] Patent Number: 4,995,567
[45] Date of Patent: Feb. 26, 1991

[54] SPRING-LOADED BARREL, IN PARTICULAR FOR A SEAT BELT RETRACTOR

[75] Inventor: Jean-Noël Ballet, Aillevilliers, France

[73] Assignee: Ecia-Equipements et Composants pour l'Industrie Automobile, Audincourt, France

[21] Appl. No.: 441,307

[22] Filed: Nov. 27, 1989

[30] Foreign Application Priority Data

Nov. 30, 1988 [FR] France .................. 88 15720

[51] Int. Cl.$^5$ ............... B65H 75/48; F03G 1/08
[52] U.S. Cl. ........................ 242/107; 185/45
[58] Field of Search ......... 242/107, 107.5; 185/45; 29/418, 446

[56] References Cited

U.S. PATENT DOCUMENTS

| | | | |
|---|---|---|---|
| 2,532,264 | 11/1950 | Smith | 242/107.5 |
| 3,033,488 | 5/1962 | Weber | 242/107.5 |
| 4,159,809 | 7/1979 | Rawson | 242/107 |
| 4,340,191 | 7/1982 | Zavatkay | 242/107 |
| 4,487,379 | 12/1984 | Drechsler | 242/107 |
| 4,771,965 | 9/1988 | Ballet | 242/107.5 X |

FOREIGN PATENT DOCUMENTS 2540671 3/1977 Fed. Rep. of Germany .
2076635 12/1981 United Kingdom .

OTHER PUBLICATIONS

Research Disclosure, No. 257, 9/1985, p. 480, Emsworth, Hampshire, GB; "Retraction Spring Cassette for Inertia Reel".

Primary Examiner—John M. Jillions
Attorney, Agent, or Firm—Robert E. Burns; Emmanuel J. Lobato

[57] ABSTRACT

The barrel, which consists, inter alia, of a casing (10) defining a chamber (100), of a coverplate (20) with an orifice (21), of a hub (30) and of a spiral spring (40), comprises a device (50) for temporarily immobilizing the hub (30) in this chamber (100) which consists of male (51) and female (52) complementary elements which are intended to be engaged in each other and are carried by the base (11) of the casing and the hub (30), where these male elements (51) are fragile and are intended to break as a result of the action exerted upon the hub (30) through the orifice (21), once the spring has been tensioned.

15 Claims, 2 Drawing Sheets

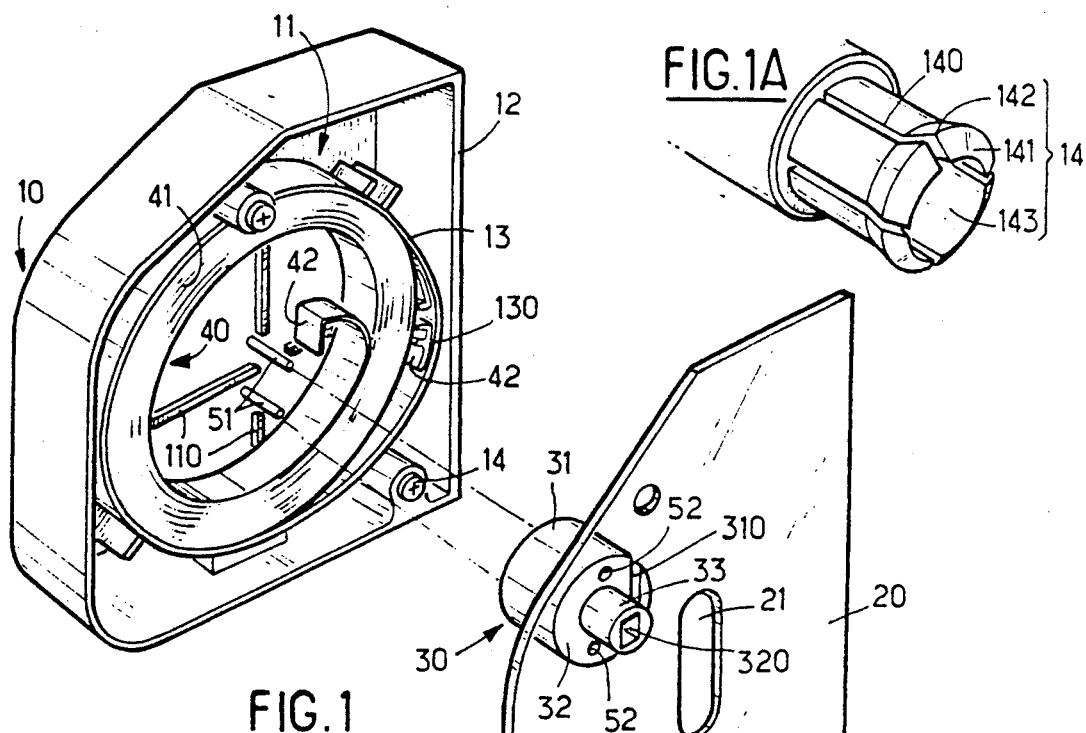
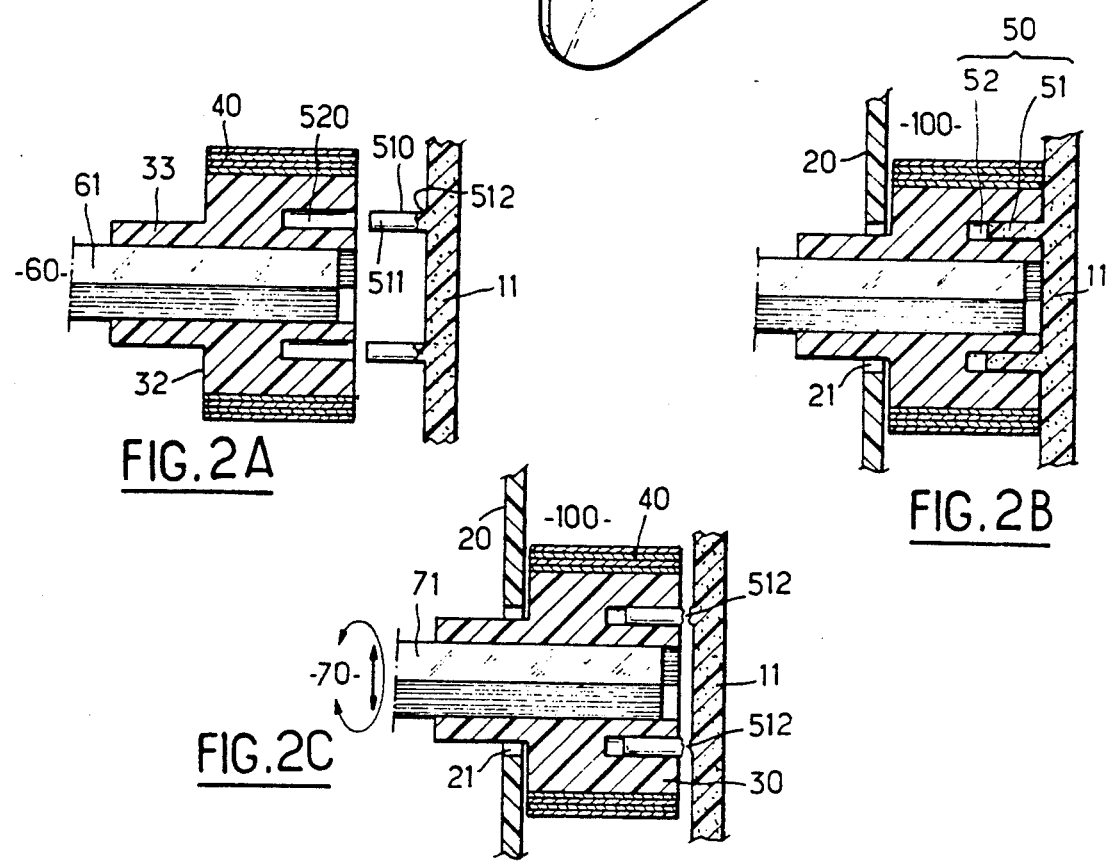

SPRING-LOADED BARREL, IN PARTICULAR FOR A SEAT BELT RETRACTOR

The invention relates to barrels with a pretensioned spiral spring and their application, in particular, to seat belt retractors for a vehicle, for example a land motor vehicle.

For the safety of their occupants, land motor vehicles are equipped with seat belts which, in order to make them easier to use whilst improving their comfort and efficiency, are equipped with a retractor. As is known, a retractor of this type has a twin purpose; on the one hand, when the belt is not used, the retractor keeps it taut against or near a side wall of the passenger cell so that it does not lie in a mess on the seat or on the floor and so that it is therefore easy to take hold of it for use; on the other hand, when the belt is used, the retractor keeps it taut and applied across the waist and the chest of the occupant so that it does not hinder his slow and gradual movements while at the same time being able to hold him effectively on his seat as a result of inertia-controlled locking in the event of a rapid and sudden displacement in the rear-front direction.

The component in a retractor of this type which keeps the belt permanently taut is a barrel with a pretensioned spiral spring. A barrel of this type essentially consists of a casing and, housed in this casing, a hub mounted so as to be able to rotate therein on its axis and a spring wound onto this hub and mounted so that one of its ends is anchored on the casing and the other on the hub. In order to generate a return torque via its hub, which is accessible from outside the casing, the spiral spring is wound more or less onto the hub by rotating the latter relative to the casing in order to tension the spring. The casing and hub with the spring tensioned in this way are then momentarily immobilized relative to each other before coupling the barrel to the retractor by connecting the hub of the barrel to a reel of the retractor on which the strap of the belt is coiled and uncoiled, dependent on the torque of the spring of the barrel.

Handling a "loaded" barrel of this type, in other words containing a pretensioned spring, is awkward. The spring must first be pretensioned so that, in the initial tensioned state, it exerts the selected torque. Next, depending on the type of operation adopted, linked to the direction of rotation for uncoiling the strap, an increase or a decrease in the return torque may be produced according to whether the spring is being wound or unwound; it is therefore necessary to adjust the number of possible revolutions of the hub allowing a maximum extension of the strap before the spring is completely tight, in the centripetal direction, turn against turn, on the hub or before the spring is completely loose, "burst open" in the centrifugal direction, turn against turn, against the casing. It is also necessary to retain the pretensioned spring in its initial state thus selected, with no risk of it spontaneously losing its tension, up until the time when, the coupling completed, if necessary counter to the initial torque, the spring will be freed so that it can generate its action.

It can therefore be seen that these operations of loading a barrel of this type and of installing this "loaded" barrel where an initial torque to be overcome is exerted during the preliminary stages of use are no easy matters.

In an attempt to overcome these difficulties, the document FR 2,482,863 provides a solution.

According to this document, in order to momentarily immobilize the hub and the casing of a loaded barrel containing a pretensioned spiral spring relative to one another, a longitudinal or transverse removable key is used which is engaged or disengaged from complementary recesses, some provided on the hub and others on the casing, which have earlier been mutually connected. This solution has numerous disadvantages. These are that, once the recesses of the hub and of the casing have been connected, the key which ensures a locking in bidirectional rotation must be inserted therein. This insertion is not without risk; the key may slip out of the hands of the operator or, during the actual insertion operation, the hub may uncoil under the action of the torque of the pretensioned spring. Furthermore, when the "loaded" barrel is being implemented, the hub must be freed from the casing so that it can rotate therein and this operation requires the removal of the key; in other words, an additional, and non-automatic, operation must be carried out which could take place prematurely with the spring consequently uncoiling or bursting open spontaneously.

The object of the invention is to overcome these types of disadvantages.

The subject of the invention is a barrel for a pretensioned spiral spring which consists, inter alia, of a casing with a base, of a coverplate intended to be placed at a distance from this base in order to define with the latter a chamber, of an orifice opening out into this chamber in order to make it accessible, of a hub equipped with a coupling member and intended to be housed in this chamber so that its axis is virtually orthogonal to this base and this coverplate and so that its member is perpendicular to this orifice in order to be accessible from the outside, and of a spiral spring intended to be placed in this chamber and coiled around this hub with one of its ends anchored on the hub and the other anchored on the casing.

This barrel is particularly noteworthy in that it comprises a device for temporarily immobilizing the hub in this chamber which consists of male and female complementary elements which are intended to be engaged in each other and which are carried by the chamber and by the hub and where the male elements are fragile so that they break when an action is exerted upon the hub through the orifice in order to free the hub relative to the casing.

Other features of the invention will emerge upon reading the description and the claims below and from examining the attached drawing, given merely by way of example, in which:

FIG. 1 is an exploded perspective view of an embodiment of a barrel according to the invention, the details of which can be seen in FIG. 1A; and FIGS. 2A, 2B and 2C are diagrammatic sketches illustrating the implementation of this barrel.

Figure 2D:
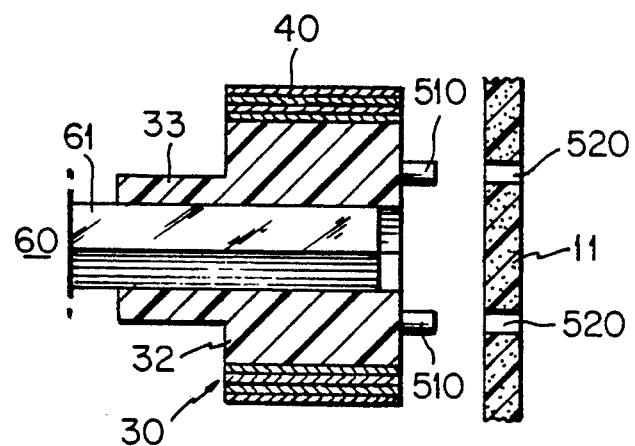
FIGS. 2D and 2E are diagramatic sketches illustrating modifications of the barrel.

Since barrels with a pretensioned spiral spring are well-known in the prior art, in particular those used for seat belt retractors, only what relates to the invention will be described in what follows. For additional information, the person skilled in the art in question will draw from the current traditional solutions at his disposal in order to deal with the particular problems with which he is confronted.

Irrespective of the embodiment, a same reference numeral always designates an identical element.

As can be seen in the figures of the drawing, a barrel according to the invention comprises a casing 10, a coverplate 20, a hub 30, a spring 40 and a device 50 for temporarily immobilizing the hub in the casing.

In order to facilitate the description, each of the components of the barrel according to the invention will be described before explaining how it is used.

As can be seen, the casing 10 comprises a base 11 on which raised ribs 110 are provided, to which we will return. This casing also comprises a lateral wall 12 and a partition 13. This partition 13 equipped with at least one cut-out 130 to which we will return.

This casing carries, in addition, fastening means 14 which are intended to join it, for example to a retractor, not shown. These fastening means 14 (FIG. 1A) comprise expansible fingers 140, the free end of which terminates in a bevel 141 preceded by a shoulder 142. The fingers, for example four, are separated from each other by a slot and define as a whole an axial channel 143. A plug, which cannot be seen, for example adjoining the base and fragile, is intended to be inserted in the channel to bring about a centrifugal displacement of the fingers after the barrel and a retractor have been joined together. In the course of this displacement, the shoulders 142 engage in complementary grooves of the body of the retractor, which is not shown in the drawing. This type of fastening means and its use are relatively traditional.

The coverplate 20, which is intended to be combined with the casing 10, is pierced, as can be seen, by an orifice 21 which is, for example, circular and preferably oblong in the shape of a buttonhole. This coverplate is equipped with appropriate studs and sealing strips, not shown in the drawing, which ensure its rigid mounting. This coverplate is intended to be placed in the casing and held at a certain distance from the base 11 so as to define a chamber 100. The coverplate rests on bearing pieces of the wall 12 and of the partition 13; these bearing pieces, which serve as braces, are illustrated and not referenced. The coverplate is fastened by any traditional technique, for example adhesive bonding, ultrasonic welding, etc. For ease of illustration, this coverplate is assumed to be transparent.

This chamber 100 receives the hub 30. As can be seen, the hub 30 has a cylindrical periphery 31 and end edge surfaces 32. This hub, approximately cylindrical about the axis 300, is equipped with a slot 310 provided in its periphery and the role of which will be detailed below. A coupling member 320, such as a bore with an inner profile which is not circular, for example with a square section, is provided along the axis of the hub. This hub is extended, if necessary, by a socket 33 to which we will return.

The spring 40 is housed in the chamber 100, one of the ends 42 of the spring being anchored on the casing 10 via the cut-out 130 and the other of the ends 42 being anchored on the hub via the slot 310. This spring is coiled around the hub so as to form turns 41.

The device 50 for temporarily immobilizing the hub 30 in the chamber 100 of the casing 10 consists of male 51 and female 52 complementary elements intended to be assembled tightly against each other. The male elements 51 are, for example, made from fragile tapered rods 510 which terminate in a free end 511 and a joining foot 512 which is the part intended to be broken. The female elements 52 are, for example, long and thin housings 520, the cross-section of which complements that of the rods 510 which they are to receive.

As has been indicated, the male 51 and female 52 elements are intended, in all cases, to be fitted tightly into each other.

Figure 2E:
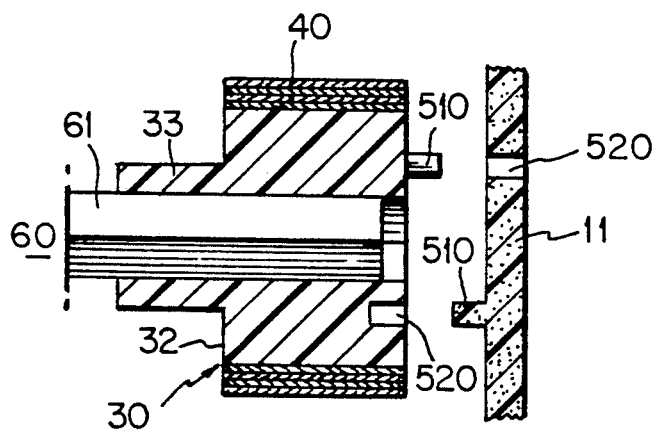
Figure 3:
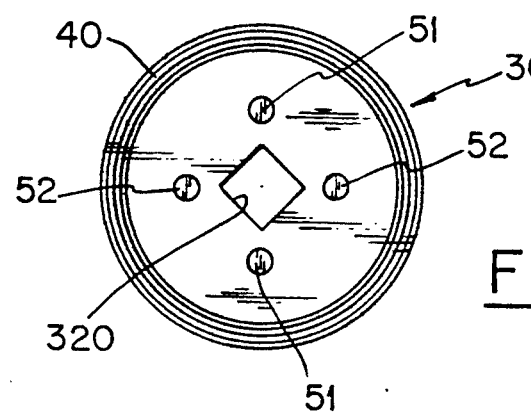
FIG. 3 is an end view of the hub.

In the embodiment shown in FIG. 2A the male elements 51 are carried by the base 11 of the casing 10 and the female elements 52 are provided on the end edge surface 32 of the hub 30 intended to face the base 11. It is clear that this solution may be reversed as shown in FIG. 2D, the male elements 510 then being carried by the hub 30 and the female elements 520 being provided on the base 11 of the casing. Similarly, the male 510 and female 520 complementary elements may be distributed in part on the base of the casing and in part on the end edge surface of the hub as shown in FIG. 2E. As can be seen in FIG. 3 the elements carried by the hub 30 are distributed around the bore 320.

In the embodiment shown, two male elements 51 and two female elements 52 have been shown in the drawing. It is clear that this number is not limiting. In particular, the number of the female elements 52 may be greater than the number of male elements 51 for the reason which will emerge below.

The coupling member, which consists of the bore 320, is intended to receive a complementary coupling member from the outside, either when the barrel is loaded or when the barrel is implemented, as will be seen below.

The bore 320 of the hub 30, which is placed perpendicular to the orifice in the coverplate 20, may receive a tool 60 and, more particularly, a key 61 which is part of a machine used for initially tensioning the spring; this key is in this instance the complementary coupling member. The profile of the bore 320 is not circular, for example square or hexagonal, and it is intended to receive a key 61 with a complementary profile. It will be noted that the engagement of these complementary coupling members is, in all cases, both "oversized" or with play, in the usual meaning of these expressions in mechanical fitting.

This bore 320 also serves to receive at a later date, when the barrel loaded with its pretensioned spring is implemented, a spindle 71 of a strap drum 70; this spindle is, in this instance, the complementary coupling member. It will be observed that the engagement of the spindle 71 in the bore 320 may be with play, oversized or tight.

The implementation of the barrel according to the invention emerges plainly from examining the various diagrammatic views A, B, C of FIG. 2 which illustrate different stages of the operating procedure.

As shown in FIG. 2A, the hub 30 is mounted on the key 61 of the tool 60 of a machine for tensioning the spring 40, one of the ends of which is anchored beforehand in the slot of the hub and the other of the ends of which is attached beforehand to the cut-out of the partition of the casing. As can be seen, the edge surface of the hub which carries the female elements is held at a distance from the casing so that the free ends of the male elements are close to the female elements but, nevertheless, at a distance from them in order not to intercept their circular trajectory, as will be understood. The coverplate has not yet been fitted, as can be observed. The spring is then tensioned, as is traditional, by, for example, rotating the tool in order to impart to it the necessary initial tension required; this tension is measured, for example, using a dynamometer combined with the tool 60. When the desired tension has been obtained, the hub is simply forcibly pushed towards the base of the casing, for example using the tool which is capable of a translational movement along its axis of rotation, so that the housings 520 cover the rods 510. As indicated, the fitting together of the male and female elements is tight or hard, in the usual meaning given to these terms in mechanical fitting, whereas, conversely, the key of the tool is engaged in the bore with play or with an oversized fitting.

It will be understood that the fitting together and release operations may be virtually simultaneous.

In order to tension the spring 40, it is also possible to use a method different to that which has been explained above. For example, the hub 30 is first fitted onto the base 11 of the casing 10 by engaging the housings 520 on the rods 510. The inner end 42 of the spring 40 is then fastened in the slot 310 of the hub 30 in order to anchor it to the latter. The spring is then tensioned by winding it up for the required number of turns before fastening its outer end 42 in the cut-out 130 of the partition 13 of the casing 10.

The casing, and all its contents, can then be separated from the machine which has tensioned the spring since the hub is now immobilized on the base as a result of the device according to the invention. The coverplate is then placed on the casing. However, it will be observed that the placing of the coverplate on the casing and its fastening may take place before or after the tool has been withdrawn from the bore of the hub. The mounted coverplate is traversed by the socket engaged in the orifice.

The loaded barrel is now ready to be used, as illustrated in FIGS. 2B and 2C. Indeed, it can be seen that the spring is pretensioned in the chamber and that it remains in this situation as it is retained by the temporary-immobilization device 50 according to the invention which momentarily joins together the hub and the casing.

When the barrel loaded in this way is combined with an apparatus, for example with a seat belt strap retractor to which it is joined by the fastening means 14 dealt with above, the spindle 71 of the strap drum 70 then engages in the bore 320. This is what has been shown in FIG. 2B.

When the seat belt is first handled, traction is exerted on the strap which tends to displace the hub immobilized in the chamber. This action is manifested either by a torque or by a translational movement or, alternatively, by a combination of the two as illustrated by a curved arrow and a straight arrow in FIG. 2C. This action is communicated to the hub, as can be readily understood, and it is such that it causes the fragile male elements 51 to break, their foot 512 shearing. The hub is then freed and it may exert its action: the torque generated by the pretensioned spring allows the strap of the seat belt to be kept taut at all times.

The ribs 110 provided on the base of the casing enable the friction of the turns of the spring to be limited. Similar ribs may be present on the coverplate for the same purpose.

When the number of the female elements is greater than that of the male elements, it is possible to obtain a more gradual adjustment of the initial tension of the spring other than by a value corresponding to a half-revolution of the hub, as is the case when only two male elements and two female elements are used.

In order to facilitate the insertion of the complementary male and female elements when the spring is tensioned, it is possible to equip either the device according to the invention or the machine which serves to tension the spring with misalignment-prevention devices which enable a correct orientation of the hub relative to the casing to be ensured prior to the engagement of the male and female elements so that this takes place accurately, in particular with no risk of damage and/or breakages of the fragile parts.

In the embodiment described and illustrated, the orifice 21 enabling access to the inside of the chamber 100 is provided in the coverplate 20 but there is no reason why it should not be cut in the base 11 of the casing 10. In order to increase the number of possible uses, an orifice of this type may also be present on the coverplate and the casing.

The casing, the coverplate and the hub are preferably obtained by moulding suitable synthetic materials.

The entire inventive step of the barrel according to the invention can therefore be seen, which barrel, although being very simple, it genuinely effective and very modest in the cost of its manufacture and implementation.

I claim:

1. Barrel for a pretensioned spiral spring which consists, inter alia, of a casing (10) with a base (11), of a coverplate (20) intended to be placed at a distance from this base (11) in order to define with the latter a chamber (100), of an orifice (21) opening out into this chamber in order to make it accessible, of a hub (30) equipped with a coupling member (320) and which is intended to be housed in this chamber (100) so that its axis (300) is virtually orthogonal to this base (11) and this coverplate (20) and so that this coupling member is perpendicular to this orifice in order to be accessible from the outside, and of a spiral spring (40) placed in this chamber (100) and coiled around this hub (30) such that one of its ends (42) is anchored on the hub (30) and the other of its ends is anchored on the casing (10), characterized in that is comprises a device (50) for temporarily immobilizing the hub (30) in this chamber (100) which consists of male (51) and female (52) complementary elements which are intended to be engaged in each other and which are carried by the chamber (100) and the hub (30) where these male elements (51) are fragile and are intended to break as a result of the action exerted upon the hub (30) through the orifice (21) once the spring has been tensioned.

2. Barrel according to claim 1, characterized in that the male elements (51) and the female elements (52) are intended to be fitted tightly together.

3. Barrel according to claim 1, characterized in that the female elements (52) are long and thin housings (520) and in that the male elements (51) are tapered rods (510) with a free end (511) and a fragile foot (512).

4. Barrel according to claim 1, characterized in that the female elements (52) are provided on the end edge surface (32) of the hub (30) which is intended to face the base (11) and in that the male elements (51) are carried by the base (11) of the casing.

5. Barrel according to claim 1, characterized in that the female elements (520) are provided on the base (11) of the casing (10) and in that the male elements (510) are carried by the end edge surface (32) of the hub (30) which is intended to face the base (11) of the casing (10).

6. Barrel according to claim 1, characterized in that the female elements (520) are provided in part on the base (11) of the casing (10) and on the end edge surface (32) of the hub (30) and in that the male elements (510) are carried in part by the base (11) of the casing (10) and by the end edge surface (32) of the hub (30).

7. Barrel according to claim 1, characterized in that the elements (51, 52) carried by the hub (30) are distributed around the coupling member (320).

8. Barrel according to claim 1, characterized in that the number of the female elements (52) is at least equal to the number of the male elements (51).

9. Barrel according to claim 1, characterized in that the orifice (21) is oblong or circular.

10. Barrel according to claim 1, characterized in that the hub (30) is equipped with a socket (33) and in that this socket (33) passes through the orifice (21).

11. Barrel according to claim 1, characterized in that the hub (30) is held in the chamber (100) by the device (50) and is free in the latter after the fragile male elements (51) have broken.

12. Barrel according to claim 1, characterized in that the orifice (21) is provided in the coverplate (20) which it pierces.

13. Barrel according to claim 1, characterized in that the coupling member (320) is a bore which is intended to receive a complementary coupling member such as a key (61) of a tool (60) with an oversized engagement or with play in order to tension the spring (40) and then fit together the male (51) and female (52) elements tightly, or such as a spindle (71) of an apparatus (70) for acting upon the hub (30), in particular in order to break the fragile male elements (51) by shearing.

14. Barrel according to claim 13, characterized in that the apparatus (70) is the drum of a seat belt strap retractor.

15. Barrel according to claim 13, characterized in that the action causing the fragile male elements (51) to break by shearing is a rotational and/or a translational movement communicated to the hub (30).

* * * * *